United States Patent
Merlo

(10) Patent No.: US 8,868,367 B2
(45) Date of Patent: Oct. 21, 2014

(54) METHOD OF COMPENSATING MEASUREMENT ERRORS OF A MEASURING MACHINE DERIVING FROM THE DEFORMATIONS OF THE MACHINE BED CAUSED BY THE LOAD EXERTED BY THE MOBILE UNIT OF THE MACHINE ON THE MACHINE BED, AND MEASURING MACHINE OPERATING ACCORDING TO SAID METHOD

(75) Inventor: Lorenzo Merlo, Turin (IT)

(73) Assignee: Hexagon Metrology S.p.A, Moncalieri (IT)

( * ) Notice: Subject to any disclaimer, the term of this patent is extended or adjusted under 35 U.S.C. 154(b) by 1082 days.

(21) Appl. No.: 12/670,367

(22) PCT Filed: Jul. 24, 2007

(86) PCT No.: PCT/IT2007/000520
§ 371 (c)(1),
(2), (4) Date: Jul. 3, 2010

(87) PCT Pub. No.: WO2009/013768
PCT Pub. Date: Jan. 29, 2009

(65) Prior Publication Data
US 2011/0054821 A1 Mar. 3, 2011

(51) Int. Cl.
*G01C 17/38* (2006.01)
*G01B 21/04* (2006.01)
(52) U.S. Cl.
CPC .................................... *G01B 21/045* (2013.01)
USPC ........................................................ 702/95

(58) Field of Classification Search
USPC ......................................................... 702/104
See application file for complete search history.

(56) References Cited

U.S. PATENT DOCUMENTS

| | | | |
|---|---|---|---|
| 5,579,246 A * | 11/1996 | Ebersbach et al. | 702/95 |
| 5,610,846 A | 3/1997 | Trapet et al. | |
| 2005/0166412 A1* | 8/2005 | Ogura et al. | 33/502 |

FOREIGN PATENT DOCUMENTS

| | | |
|---|---|---|
| DE | 10214489 A1 | 10/2003 |
| EP | 0275428 A | 7/1988 |
| EP | 1239263 A | 9/2002 |
| EP | 1559990 A | 8/2005 |

OTHER PUBLICATIONS

PCT International Search Report for application PCT/IT2007/000520, mailed on Apr. 3, 2008.

* cited by examiner

*Primary Examiner* — Aditya Bhat
(74) *Attorney, Agent, or Firm* — FSP LLC

(57) ABSTRACT

A method of compensating the measurement errors of a measuring machine deriving from the deformations of a machine bed of the machine caused by the load exerted by a mobile unit of the machine on said machine bed, said method being characterized by comprising a first acquisition step in which first data regarding the constraint conditions of a workpiece on the machine bed are acquired, a second acquisition step in which second data regarding the deformation of the machine bed as the position of the mobile unit of the machine varies are acquired, and a third calculation step in which correction values depending upon said first and second data are calculated.

11 Claims, 4 Drawing Sheets

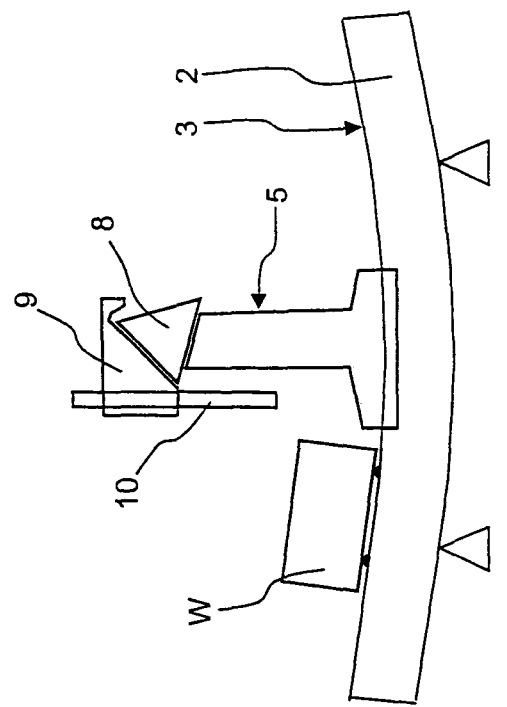
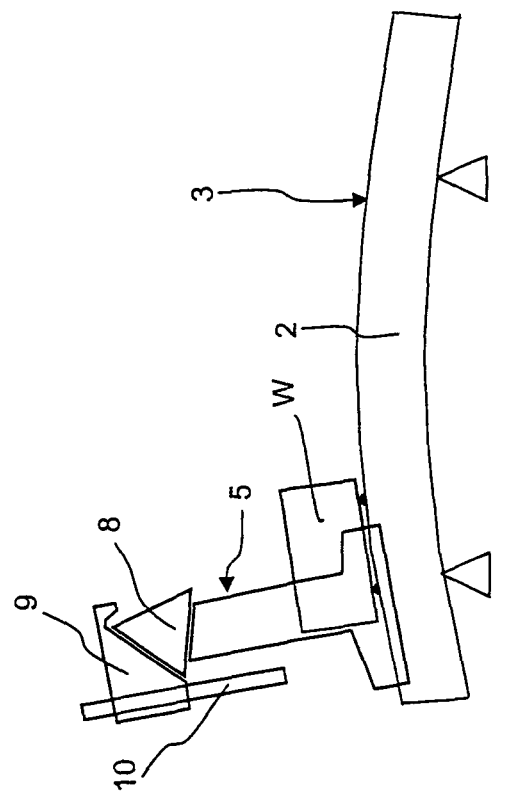

US 8,868,367 B2

METHOD OF COMPENSATING MEASUREMENT ERRORS OF A MEASURING MACHINE DERIVING FROM THE DEFORMATIONS OF THE MACHINE BED CAUSED BY THE LOAD EXERTED BY THE MOBILE UNIT OF THE MACHINE ON THE MACHINE BED, AND MEASURING MACHINE OPERATING ACCORDING TO SAID METHOD

PRIORITY CLAIM

This application claims priority under 35 U.S.C. 365 AND/OR 35 U.S.C. 119 to PCT application no. PCT/IT2007/000520 filed on Jul. 24, 2007.

TECHNICAL FIELD

The present invention relates to a method of compensating the measurement errors of a measuring machine deriving from the deformations of the machine bed caused by the load exerted by the mobile unit of the machine on the machine bed, as well as to a measuring machine operating according to said method.

BACKGROUND ART

As is known, measuring machines are generally provided with a fixed base or machine bed and a mobile unit designed to move a measuring head according to co-ordinate axes with respect to the machine bed in a measurement space located above the machine bed. The mobile unit generally comprises a main carriage, which is mobile along an axis that is longitudinal with respect to the machine bed, and one or more carriages carried by the main carriage, which are mobile along respective co-ordinate axes.

The machine bed can be monolithic, for example made of granite or cast iron, or else can comprise a set of components rigidly fixed to one another to form a substantially rigid structure. The machine bed generally has two functions: supporting and constraining the workpiece being measured, and defining a guide for the mobile unit, and in particular for the main carriage of the machine, along one of the co-ordinate axes of the machine.

Measuring machines of the aforesaid type are generally provided with a system for compensation of geometrical errors, i.e., of the measurement errors that depend upon the constructional defects of the machine (for example, rectilinearity errors of the axes, defects of orthogonality between the axes, etc.).

During operation of the machine, variable elastic deformations of the machine bed arise on account of the loads exerted on the machine bed by the mobile unit of the machine as the position of the carriages varies. This brings about an alteration of the position and attitude of the workpiece with respect to the attitude reference used for the geometrical compensation.

Current compensation techniques, based upon compensation maps determined statically, do not take into account this phenomenon, which can give rise to non-negligible measurement errors.

DISCLOSURE OF INVENTION

The aim of the present invention is to propose a compensation method that will be free from the drawbacks proper to the known methods and that will in particular enable the measurement errors induced by the deformations of the machine bed due to the load exerted on the machine bed by the mobile unit of the machine to be taken into account.

The aforesaid purpose is achieved by a compensation method according to claim 1.

The present invention likewise regards a measuring machine operating according to said method.

BRIEF DESCRIPTION OF THE DRAWINGS

For a better understanding of the present invention, described in what follows is a preferred embodiment, provided by way of non-limiting example with reference to the annexed drawings, wherein:

FIG. 2 is a schematic side view of the machine of FIG. 1, in a first position of the mobile unit;

FIG. 3 is a schematic side view of the machine of FIG. 2, in a second position of the mobile unit;

BEST MODE FOR CARRYING OUT THE INVENTION

Figure 1:
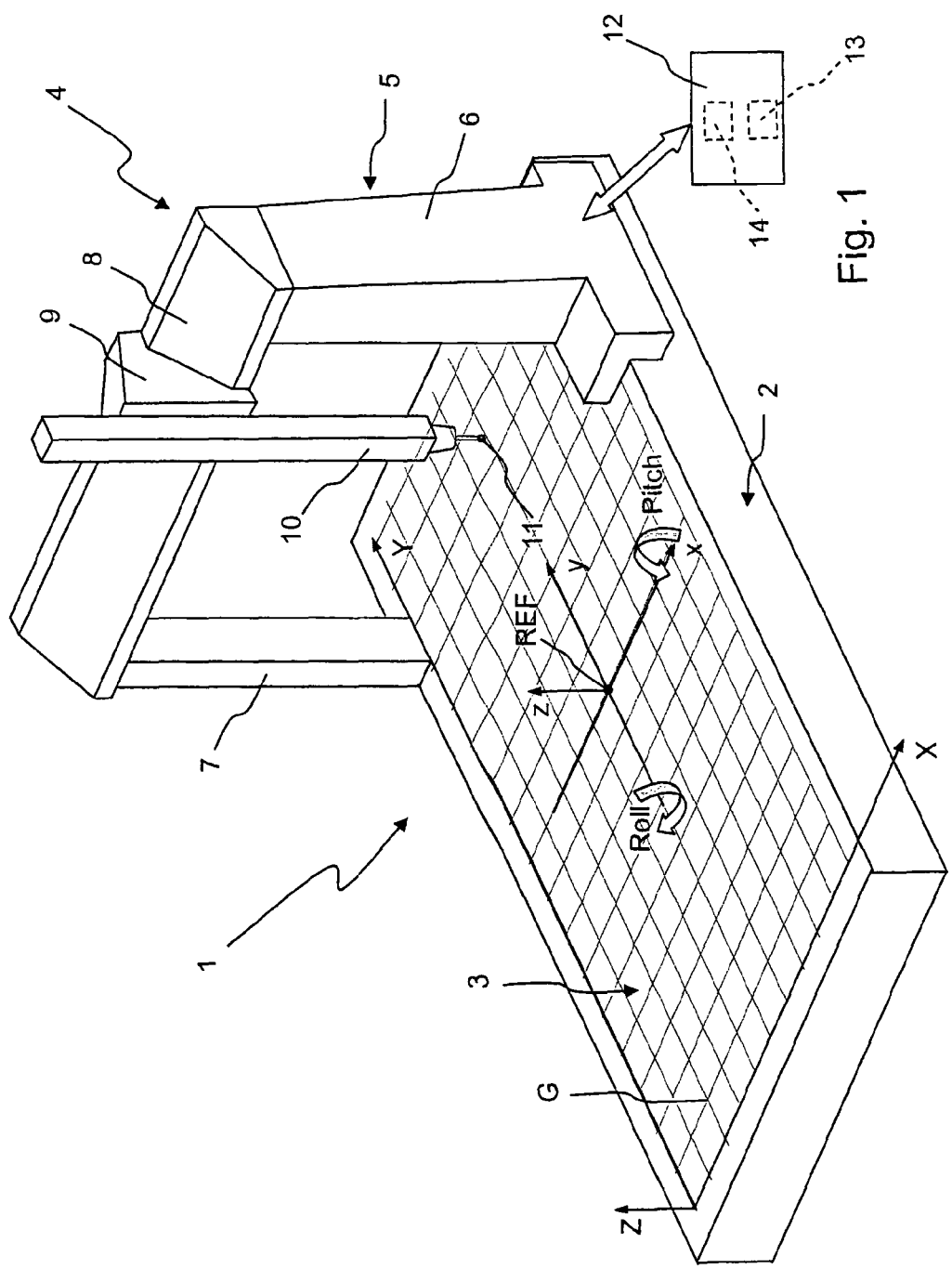
FIG. 1 is a schematic perspective view of a measuring machine operating according to the method of the present invention.

With reference to FIG. 1, designated as a whole by 1 is a portal measuring machine. It is at once pointed out that the method forming the subject of the present invention can be used for the compensation of the errors of machines of different architecture, for example with horizontal arm or pillars.

The machine 1 comprises a plane machine bed 2, provided with a horizontal working surface 3 and designed to support an object to be measured (not illustrated), and a unit 4, which is mobile with respect to the machine bed 2 along co-ordinate axes.

The unit 4 comprises a main portal carriage 5 (in what follows, for reasons of brevity, "portal 5"), which is mobile with respect to the machine bed 2 along a horizontal axis Y. The portal 5 is provided with a pair of uprights 6 and 7 and a cross-member 8 extending between the uprights 6 and 7 in a direction parallel to a horizontal axis X and perpendicular to the axis Y.

The unit 4 moreover comprises a secondary carriage 9, carried by the cross-member 8 and mobile on the cross-member along the axis X, and a measurement column 10, carried by the carriage 9 and mobile with respect thereto along a vertical axis Z orthogonal to the axes X and Y.

Mounted on a bottom end of the column 10, possibly via a two-axes articulation device (not illustrated) is a touch probe 11.

The portal 5, the carriage 9, and the column 10 are mobile under the control of respective electric motors (not illustrated), which are in turn controlled by a measurement and control unit 12. The latter is connected to position transducers (not illustrated) associated to the machine axes and to the probe 11 so as to receive from the latter signals for enabling acquisition of the instantaneous co-ordinates of the machine axes.

The machine 1 is equipped with a system for compensating geometrical errors that is in itself known. Compensation is carried out on the basis of a stored map 13 determined in loadless conditions via a kinematic model of the machine of a conventional type.

With reference to FIG. 1, identified on the working surface is a fixed reference setting position REF used for geometrical compensation of the machine. Defined moreover is a cartesian reference system x,y,z with axes parallel to the axes X, Y, Z of the machine and origin in the point REF.

The compensation map is obtained in a known way, and hence not described in detail herein, by detecting the error parameters in points appropriately set at a distance from one another along the axes x, y, z. For each of the aforesaid points, differential position measurements are carried out with respect to the point REF, for example via an interferometer, and differential inclination measurements, for example using a fixed inclinometer located in the point REF and an inclinometer mounted on the mobile unit 4.

According to the present invention, an additional compensation method is proposed that will moreover enable determination of the effects of the deformation of the machine bed 2 due to the load exerted by the mobile unit 4 on the machine bed. For metrological purposes, said effects basically result in an alteration of the position and of the angular attitude of the workpiece, which are not constant with respect to the attitude reference REF used for geometrical compensation of the machine.

Said alterations are highlighted schematically from a comparison of FIGS. 2 and 3, in which the variation in position and attitude of the workpiece W, as the position of the mobile unit 4 varies on account of the deformation of the machine bed 2, is evident.

Given a machine model with its dimensional and weight characteristics, the deformation of the machine bed 2 caused by the movement of the mobile unit 4 can be evaluated with high precision via numeric simulation methods (for example, with finite-element analysis).

Figures 4, 5:
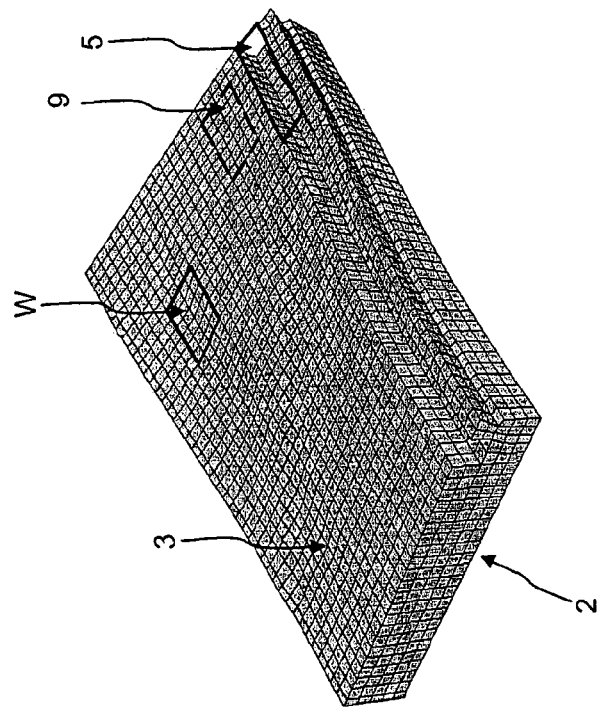
FIG. 4 is a schematic perspective view of the machine bed representing the deformations induced by the weight of the mobile unit.
FIG. 5 is an example of a table giving the pitch and roll rotations of specific points of the machine bed in a pre-set position of the mobile unit of the machine.

The calculation moreover enables determination of the deformation effects on the machine bed 2 in terms of attitude variations of a workpiece W placed in a given position on the working surface (FIG. 4).

Alternatively, the same attitude variations of the workpiece in the different positions can be detected experimentally while running the procedure of geometrical compensation of the machine.

In any case, once the attitude variations of a workpiece W placed on the working surface 3 as the position of the mobile unit 4 of the machine varies are known, these can be stored in the compensation map of the machine, either as independent parameters or as additional corrections to existing parameters.

Using said parameters, it is possible to obtain the compensation of the deformation phenomenon being examined.

Numeric simulation can be implemented on the machine, for example, in one of the following ways:
  integration of a finite-element model and of the corresponding calculation program in the measurement and control unit 12 of the machine 1; at each placing of the workpiece, the calculating routine is set up and run; and
  storage in the measurement and control unit 12 of the machine 1 of a map containing deformation data of the machine bed calculated previously once and for all for a pre-defined set of loading cases.

Described in what follows is an example of embodiment of the second mode of implementation described above.

On this hypothesis, it is assumed that the main attitude variations of the workpiece W, caused by the deformation of the machine bed 2, are the rotations about the horizontal axes (x and y), whilst the other components are neglected. The compensation method is, however, to be considered altogether general and applicable to any deformation component.

The rotations about the axes x and y, referred to as pitch and roll, correspond to the ones considered by the geometrical compensation commonly used, as described above, and are understood with respect to the reference system x, y, z, fixed with respect to the point REF.

Once the geometrical characteristics of the machine 1 are known, using the finite-element calculation it is possible to create a map that contains the vertical displacement values of a series of characteristic points of the working surface. Said points can be arranged, for example, according to a grid G, which covers the entire working surface with an appropriate pitch, for example 100 mm (FIG. 1).

The vertical displacement values are calculated by imposing as stressing load the load exerted by the mobile unit 4. The calculation is performed as the position of the portal 5 and of the secondary carriage 9 along their respective paths varies, with an appropriate movement pitch (e.g. 100 mm).

The displacements are also referred to the reference system x,y,z, fixed with respect to the point REF.

The deformation map thus created is stored in the measurement and control system of the machine as being characteristic of that given machine model.

According to a preferred embodiment of the invention, the method envisages a series of rules and assumptions that will enable any actual resting mode of the workpiece W to be brought back to an equivalent standard mode that can be represented using the characteristic points chosen.

The standard resting modes taken into account can be, for example, the following:
a) resting on any three points;
b) resting on four points at the vertices of a rectangle oriented parallel to XY; and
c) resting distributed over a rectangular area oriented parallel to XY and approximated by an integer number of meshes of the grid.

Once the standard resting modes have been defined, it is necessary to define rules of interpolation and calculation to obtain, for the various standard resting modes, the attitude variations of the workpiece, understood as pitch and roll angles as a function of the position of the machine carriages.

Said rules may, for example, be the following:
  in the case of point resting, the displacement of each resting point is calculated by interpolating the displacements of the vertices of the grid mesh containing the resting point;
  in the case of distributed resting, the rotation of the resting area is calculated on the basis of the displacements of the vertices of the area.

Given any actual resting load, it is consequently possible to calculate the corresponding pitch and roll rotation values of the workpiece by proceeding as follows:
  extraction from the deformation map of the vertical displacement values regarding grid points close to the resting points or area of the workpiece;
  calculation of the vertical displacement of the resting points (modes a and b) or of the vertices of the resting area (mode c); and
  calculation of the pitch and roll rotation angles of the workpiece W.

For a given position of the workpiece (FIG. 4), it is consequently possible to obtain and store a table that gives the pitch and roll rotation values of as the position of the portal 5 (Y co-ordinate) and of the secondary carriage 9 (X co-ordinate) varies. An example of said tables is provided in FIG. 5.

The rotations so calculated are rotations of the workpiece with respect to the attitude reference (REF) used for the geometrical compensation of the machine and can be viewed, from the point of view of the workpiece, as rotations of the portal 5 of the machine, the attitude of said portal with respect to the position REF being known.

Said rotations can hence be used as correction (by appropriately setting the sign) for updating the section of the geometrical-compensation map of the machine regarding the portal 5 and hence correcting the measurements made on the workpiece.

Figure 6:
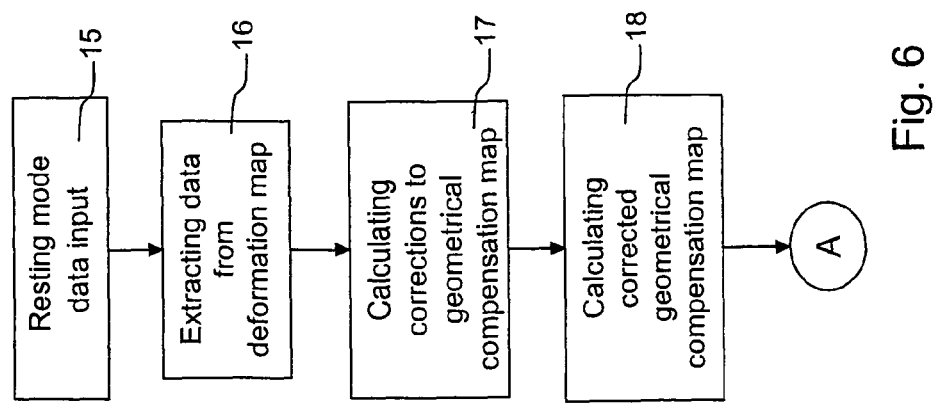
FIG. 6 is a block diagram of the method of the present invention.

The method is implemented as processing program according to the block diagram of FIG. 6.

A first input block 15 enables acquisition of the data regarding the resting mode of the workpiece.

Said acquisition can be carried out by manual input. In particular, the operator enters (by typing in from a keyboard or via graphic interface) the data regarding placing of the workpiece in the specific case:
 the resting mode, chosen from amongst the available standard ones;
 according to the previous choice, the data necessary for the calculation:
 co-ordinates of the resting points;
 limits X and Y of the rectangular resting area.

Alternatively, the step described above for data acquisition can be automatic: during the alignment step prior to measurement, the points acquired by the measuring machine can be used for determining the position of the workpiece on the working surface for the modes b) and c).

In a subsequent block 16, the program extracts from the pre-defined deformation map 14, the vertical displacements of the points of the grid involved in the resting mode.

Control then passes to a subsequent processing block 17, where the data regarding the resting mode are processed on the basis of the rules described above for determining the pitch and roll rotations of the workpiece W, i.e., the correction values to the geometrical-compensation map.

Finally, in block 18 the correction values are used for correcting the geometrical-compensation map and thus calculating a corrected geometrical-compensation map, which depends not only upon the machine model but also upon the workpiece measured and upon the resting modes of the workpiece.

The data set entered and calculated during the step of compensation can be stored for a subsequent re-use in the case of measurement of a similar workpiece.

The machine 1 is now ready for execution of a measurement cycle.

Figure 7:
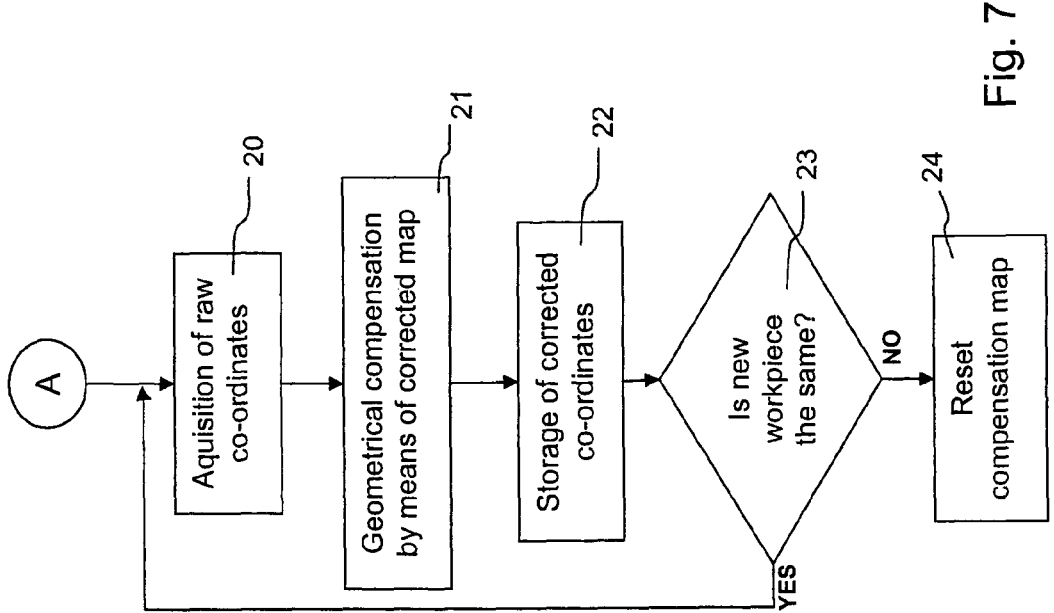
FIG. 7 is a block diagram of a measurement method, which uses a corrected compensation map obtained using the method of the invention.

The block diagram of FIG. 7 illustrates a workpiece measurement procedure.

From a measurement block 20, in which the machine 1 acquires the "raw" co-ordinates, i.e., the ones not yet compensated and hence subject to errors of a geometrical nature, control passes to a block 21, in which the raw co-ordinates are compensated in a way similar to what occurs in conventional machines but, according to the present invention, by means of the corrected geometrical-compensation map.

Consequently, the measurements will be purged of the negative effects of the phenomenon under examination.

The "corrected" co-ordinates thus calculated are stored in block 22.

At the end of the measurement, the operator can conveniently choose (block 23) whether to maintain the corrected map active, for measuring another workpiece of the same type, or else return to the previous situation (block 24 for reset of the compensation map).

Since the positions of the workpiece on the working surface and the possible resting modes are theoretically infinite, the method can comprise, as integration of what has been described, the indication of guidelines for placing the workpiece, so as to render the actual working conditions as close as possible to the ones considered in the theoretical model, upon which the compensation is based.

From an examination of the characteristics of the compensation method described, the advantages that it affords are evident.

In particular, in addition to the usual geometrical compensation, also the geometrical errors induced by the deformation of the machine bed 2 as a result of the load exerted by the mobile unit 4 of the machine on the machine bed are compensated. This makes it possible to take into account, in the compensation, the attitude variations of the workpiece, depending upon the resting modes thereof on the machine bed, as the position of the portal 5 and of the carriage 9 varies.

Finally, it is clear that modifications and variations can be made to the method described herein, without thereby departing from the sphere of protection specified in the annexed claims.

In particular, even though the method has been described with reference to a portal machine, it is altogether general and can be applied to machines of any type, even non-cartesian ones.

Furthermore, even though the method has been described with reference to the compensation of the rotation errors, it can be extended to the correction of any geometrical error induced by the load exerted by the mobile unit.

The invention claimed is:

1. A method of compensating the measurement errors of a measuring machine, the method comprising:
 deriving deformations of a machine bed of the machine caused by a present load exerted by a mobile unit of the machine on said machine bed by acquiring first data representing constraint conditions of a workpiece on the machine bed wherein said constraint conditions comprise a position of said workpiece on said machine bed when the mobile unit is not moving;
 acquiring second data regarding the deformation of the machine bed as the position of the mobile unit of the machine varies; and
 calculating correction values depending upon said first and second data.

2. The method according to claim 1, further comprising:
 calculating data for correction of a previously stored geometrical-compensation map.

3. The method according to claim 1, further comprising:
 calculating a workpiece attitude variation as a function of said first and second data.

4. The method according to claim 3, further comprising:
 the attitude of the piece is calculated on the basis of the vertical displacement of points of the machine bed that identify the position thereof.

5. The method according to claim 1, further comprising:
 said second data comprises the vertical displacements of the points of a grid on a working surface of said machine bed calculated as the position of said mobile unit varies.

6. The method according to claim 1, further comprising:
 said first step comprises selection from among a plurality of standard resting modes for said workpiece.

7. The method according to claim 6, further comprising:
said standard resting modes comprise at least a mode of resting on three points.

8. The method according to claim 6, further comprising:
said standard resting modes comprise at least a mode of resting on four points at the vertices of a rectangle oriented parallel to two co-ordinate axes (X, Y) of the working surface.

9. The method according to claim 6, further comprising:
said standard resting modes comprise at least a mode of resting distributed over a rectangular area oriented in a direction parallel to two co-ordinate axes (X, Y) of the working surface.

10. The method according to claim 1, further comprising:
said correction values are calculated on the basis of a simplified model that takes into account only the rotations of the workpiece with respect to the co-ordinate axes (X, Y) of the working surface.

11. A measuring machine, comprising:
a machine bed a mobile unit for moving a measurement sensor with respect to said machine bed said machine further comprising a system for compensating measurement errors deriving from deformations of the machine bed, the deformations caused by a load exerted by the mobile unit on the machine bed;
said machine adapted and arranged to compensate measurement errors deriving from the deformations by (a) acquiring constraint conditions of a workpiece on the machine bed, wherein said constraint conditions comprise a position of said workpiece on said machine bed when the mobile unit is not moving (b) acquiring data regarding the deformation of the machine bed as the position of the mobile unit of the machine varies, and (c) determining correction values depending upon said data regarding the deformations and said constraint conditions.

* * * * *